US008116252B2

(12) United States Patent
Balasubramanian et al.

(10) Patent No.: US 8,116,252 B2
(45) Date of Patent: Feb. 14, 2012

(54) FIXED MOBILE CONVERGENCE (FMC) ARCHITECTURES

(75) Inventors: Srinivasan Balasubramanian, San Diego, CA (US); Leslie Chiming Chan, San Diego, CA (US); Murali B. Bharadwaj, San Diego, CA (US); Uppinder Singh Babbar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 483 days.

(21) Appl. No.: 12/474,053

(22) Filed: May 28, 2009

(65) Prior Publication Data

US 2009/0323658 A1 Dec. 31, 2009

Related U.S. Application Data

(60) Provisional application No. 61/057,123, filed on May 29, 2008.

(51) Int. Cl.
*H04L 12/26* (2006.01)
(52) U.S. Cl. ...................................... 370/313
(58) Field of Classification Search ................. None
See application file for complete search history.

(56) References Cited

U.S. PATENT DOCUMENTS

| 7,162,236 | B2 | 1/2007 | Dorenbosch et al. |
| 7,254,119 | B2 | 8/2007 | Jiang et al. |
| 7,330,453 | B1 | 2/2008 | Borella et al. |
| 2003/0145013 | A1 | 7/2003 | Kovarik et al. |
| 2004/0042423 | A1 | 3/2004 | Borella et al. |
| 2004/0267874 | A1* | 12/2004 | Westberg et al. ............ 709/200 |
| 2005/0021713 | A1 | 1/2005 | Dugan et al. |
| 2006/0039538 | A1 | 2/2006 | Minnis et al. |
| 2006/0130136 | A1 | 6/2006 | Devarapalli et al. |
| 2007/0019643 | A1 | 1/2007 | Shaheen |
| 2007/0243872 | A1 | 10/2007 | Gallagher et al. |
| 2007/0247395 | A1* | 10/2007 | Barraclough et al. ......... 345/51 |
| 2008/0095070 | A1 | 4/2008 | Chan et al. |
| 2010/0074172 | A1* | 3/2010 | Fontaine et al. ............. 370/328 |

FOREIGN PATENT DOCUMENTS

WO  WO02076049 A1  9/2002

(Continued)

OTHER PUBLICATIONS

3GPP TS 43.318: "3rd Generation Partnership Project; Technical Specification Group GSM/EDGE Radio Access Network; Generic Access Network (GAN); Stage 2 (Release 8)" Internet Article, [Online] Feb. 2008, pp. 1-122, XP002552032 Retrieved from the Internet: URL:http://www.3gpp.org/ftp/Specs/archive/43_series/43.318/43318-810.zip> [retrieved on Oct. 23, 2009] section 8.4.1.6.

(Continued)

*Primary Examiner* — Raj Jain
(74) *Attorney, Agent, or Firm* — Darren M. Simon

(57) ABSTRACT

Apparatus and methods are described for establishing a connection to a subscriber access network, such as a 3G network, over and untrusted network, such as a wireless LAN. A stream ID is assigned to a mobile device upon initialization of the device, and the stream ID remains active until the device powers down, loses WLAN coverage, or de-registers with the network. Both voice and data calls may be routed over the tunnel using the assigned stream ID.

27 Claims, 5 Drawing Sheets

FOREIGN PATENT DOCUMENTS

| WO | WO2006138408 A2 | 12/2006 |
|---|---|---|
| WO | WO2007086812 A1 | 8/2007 |

OTHER PUBLICATIONS

"3rd Generation Partnership Project; Technical Specification Group Services and System Aspects; Support of Push service (Release 5); 3GPP TR 23.875" ETSI Standards, Lis, Sophia Antipolis Cedex, France, vol. 3-SA2, No. V5.1.0, Mar. 1, 2002, pp. 1-70, XP014033551 ISSN: 0000-0001 sections: 7.3.5.1, 7.6.1, 7.6.2.

Alcatel-Lucent: "Alignment of layout of access technology specific annexes" 3GPP Draft; C1-070864-Align, 3rd Generation Partnership Project (3GPP), Mobile Competence Centre; 650, Route des Lucioles; F-06921 Sophia-Antipolis Cedex; France, vol, CT WG1, No. Warsaw, Poland; 20070402, Apr. 2, 2007, pp. 1-16, XP050025081 [retrieved on Apr. 2, 2007] p. 2-p. 3; p. 8-p. 9.

International Search Report and Written Opinion—PCT/US2009/045347, International Search Authority—European Patent Office—Oct. 27, 2009.

International Search Report and Written Opinion—PCT/US2009/045727, International Search Authority—European Patent Office—Nov. 6, 2009.

International Search Report and Written Opinion—PCT/US2009/045731, International Search Authority—European Patent Office—Nov. 30, 2009.

"Universal Mobile Telecommunications System (UMTS); 3GPP system to Wireles Local Area Network (WLAN) interworking; System description (3GPP TS 23.234 version 7.6.0 Release 7); ETSI TS 123 234" ETSI Standards, Lis, Sophia Antipolis Cedex, France, vol. 3-SA2, No. V7.6.0, Jan. 1, 2008, XP014040569 ISSN: 0000-0001 pp. 65-68.

Veltri L., et al., "Wireless LAN-3G Integration: Unified Mechanisms for Secure Authentication based on SIP" Communications, 2006. ICC '06. IEEE International Conference on, IEEE, PI, Jun. 1, 2006, pp. 2219-2224, XP031025394 ISBN: 978-1-4244-0354-7 right-hand col. line 4—p. 2223, left-hand col., line 5; figures 1-3.

\* cited by examiner

FIXED MOBILE CONVERGENCE (FMC) ARCHITECTURES

CLAIM OF PRIORITY UNDER 35 U.S.C. §119

The present application for patent claims priority to Provisional Application No. 61/057,123 entitled "Fixed Mobile Convergence (FMC) Architectures" filed May 29, 2008, and assigned to the assignee hereof and hereby expressly incorporated by reference herein.

REFERENCE TO CO-PENDING APPLICATIONS FOR PATENT

The present Application for Patent is related to the following co-pending U.S. Patent Applications:

U.S. patent application Ser. No. 12/472,274 entitled "FMC for CDMA Network" filed May 26, 1009, assigned to the assignee hereof, and expressly incorporated by reference herein; and "Fixed Mobile Convergence (FMC) with PDIF and SIP Gateway" having Ser. No. 12/474,062, filed concurrently herewith, assigned to the assignee hereof, and expressly incorporated by reference herein.

BACKGROUND

1. Field

The application relates generally apparatus and methods of routing voice and data traffic using tunneling.

2. Background

Mobile communication devices are no longer limited to simply making and receiving voice calls. Users of such devices want to access audio, video, text, and or other content from any location. Dual mode devices exist which enable a mobile device to operate using more than one type of communication network. For example, a device may be configured to use 802.11 WLAN and a 3G cellular network.

3G networks provide subscription based access, and use a licensed spectrum to provide wireless coverage to its subscribers. 802.11 WLANs, by contrast, operate using an unlicensed spectrum, and therefore may be considered untrusted networks. Typically, a data session must be activated each time a device requests a data transfer. This creates additional latency. It would be desirable to have a method of reducing latency associated with data session establishment.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to some aspects, a method for establishing a connection of a mobile station to a subscriber access network over an untrusted network comprises receiving a SIP-based registration request from the mobile station to connect to the 3G network, the registration request including a unique identifier associated with the mobile device; assigning a first stream identifier (ID) to the mobile station, the first stream ID used to transmit and receive data on the 3G network; and creating a first tunnel to the mobile station over which voice and data traffic is routed, wherein the first stream ID assignment and the first tunnel remain active as long as the mobile station remains registered.

According to some aspects, an apparatus comprises a receiver configured to receive a SIP-based registration request from a mobile station to connect to a subscriber access network over an untrusted network, the registration request including a unique identifier associated with the mobile device; a processor configured to assign a first stream identifier (ID) to the mobile station for transmitting and receiving data on the subscriber access network and to create a first tunnel to the mobile station over which voice and data traffic is routed; and a memory coupled to the processor for storing data, wherein the first stream ID assignment and the first tunnel remain active as long as the mobile station remains registered with the network.

According to some aspects, at least one processor configured to establish a connection of a mobile station to a subscriber access network over an untrusted network comprises a first module for receiving a SIP-based registration request from the mobile station to connect to the subscriber access network, the registration request including a unique identifier associated with the mobile device; a second module for assigning a first stream identifier (ID) to the mobile station, the first stream ID used to transmit and receive data on the subscriber access network; and a third module for creating a first tunnel to the mobile station over which voice and data traffic is routed, wherein the first stream ID assignment and the first tunnel remain active as long as the mobile station remains registered.

According to some aspects, a computer program product, comprising a computer-readable medium comprises a first set of codes for causing a computer to receive a SIP-based registration request from the mobile station to connect to a subscriber access network, the registration request including a unique identifier associated with the mobile device; a second set of codes for causing the computer to assign a first stream identifier (ID) to the mobile station, the first stream ID used to transmit and receive data on the subscriber access network; and a third set of codes for causing the computer to create a first tunnel to the mobile station over which voice and data traffic is routed, wherein the first stream ID assignment and the first tunnel remain active as long as the mobile station remains registered.

According to some aspects, a method of connecting to a subscriber access network over a wireless local area network (WLAN) comprises transmitting a SIP-based registration request to a SIP gateway (SIP GW) to request connectivity to the subscriber access network, the registration request including a unique identifier; and receiving a first stream ID from the SIP GW, the first stream ID used to communicate in the subscriber access network over a tunnel established by the SIP GW upon registration, wherein the first stream ID assignment and tunnel remain active.

According to some aspects, an apparatus comprises means for transmitting a SIP-based registration request to a SIP gateway (SIP GW) to request connectivity to a subscriber access network, the registration request including a unique identifier and means for receiving a first stream ID from the SIP GW, the first stream ID used to communicate in the subscriber access network over a tunnel established by the SIP GW upon registration, wherein the first stream ID assignment and tunnel remain active for use in subsequent communication sessions.

According to some aspects, an apparatus comprises a transmitter configured to transmit a SIP-based registration request to a SIP GW to request connectivity to a subscriber access network, the registration request including a unique identifier and a receiver configured to receive a first stream ID from the SIP GW, the first stream ID used to communicate in the subscriber access network over a tunnel established by the SIP GW upon registration, wherein the first stream ID assignment and the tunnel remain active for used in subsequent communication session.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
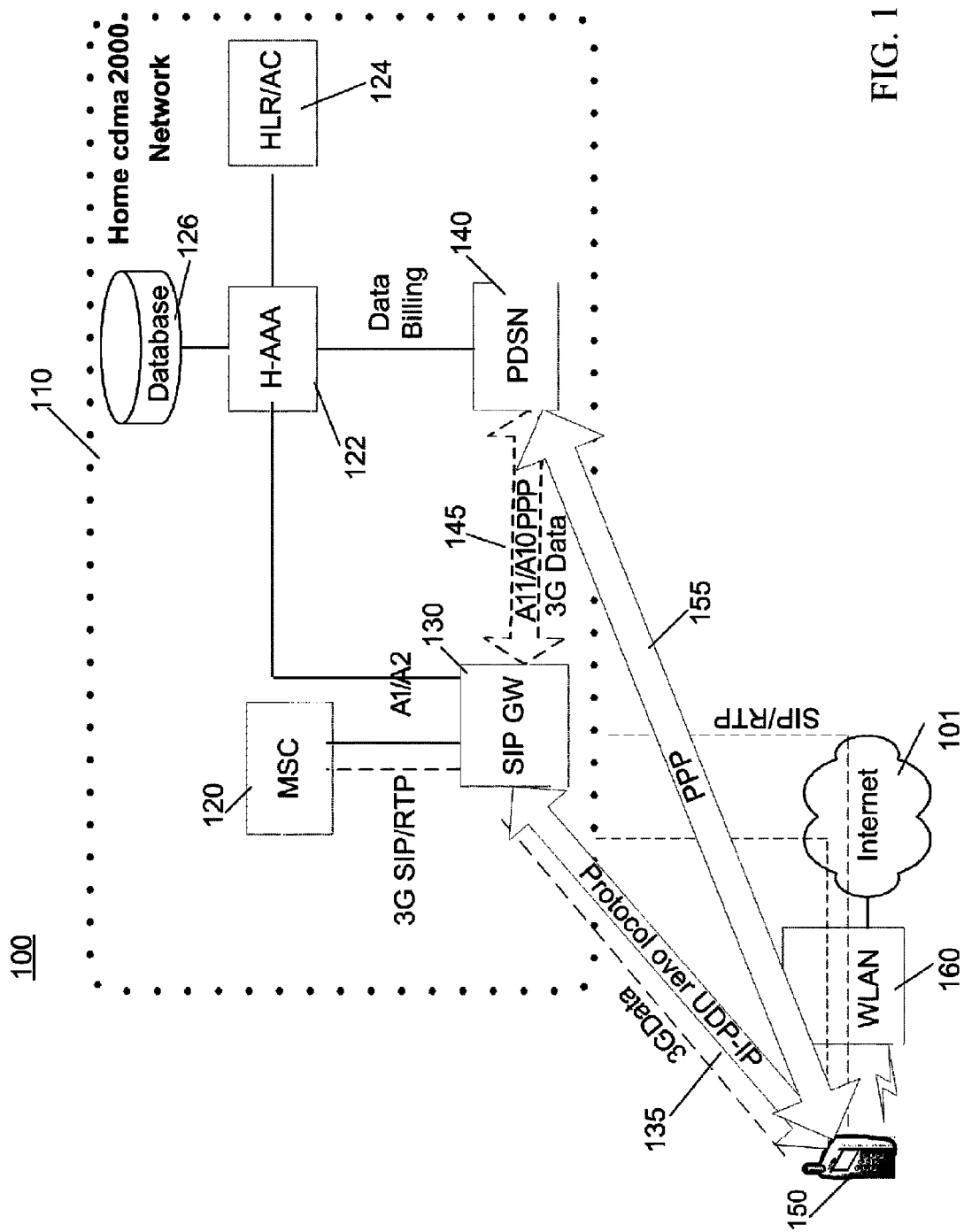
FIG. 1 is an exemplary communication system implementing various discloses aspects.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

FIG. 1 depicts a communication system 100 implementing various disclosed aspects. A subscriber access network, such as third generation (3G) cellular network 110 comprises a packet data serving node (PDSN) 140, a mobile switching center (MSC) 120, home authentication, authorization and accounting (H-AAA) server 122, home location register/authentication center (HLR/AC) 124, database 126, and session initiation protocol (SIP) gateway (GW) 130. A mobile station (MS) 150 may access the Internet 101 via and untrusted network, such as a wireless local area network (WLAN) access point (AP) 160 while taking advantage of the 3G backend and authentication services. WLAN AP 160 may provide IEEE 802.xx, where "xx" stands for a version number such as "11," wireless connectivity. Devices other than a mobile station may also be used such as, for example, a laptop computer. Moreover, while WLAN AP 160 is depicted and IEEE 802.xx is discussed, other connectivity protocols may be used such as, for example, WiMax, DSL, and/or other connectivity protocols. 3G network 110 may be, for example, a CDMA2000 network. Other types of subscriber access networks may also be used.

PDSN 140 may be configured to provide packet data communications to the MS 150 over the WLAN AP 160 and through the 3G network 110. The PDSN 140 also interfaces with H-AAA 122 to execute functions for authentication, authorization, and accounting through the H-AAA 122. H-AAA 122 authenticates and authorizes MS 150 to allow access to network services. MSC 120 switches traffic originating or terminating at wireless device 150. MSC 120 may provide an interface for user traffic between the wireless network and other public switched networks or other MSCs. HLR/AC 124 stores address location data associated with all connected mobile stations, such as MS 150.

SIP gateway 130 enables MS 150 to access 3G network 110 services over WLAN 160, maintaining the conventional 3G backend architecture and authentication procedures. MS 150 and SIP GW 130 use SIP signaling to establish a connection between the MS 150 and the 3G network 110 over WLAN 160. Data is transferred between the MS 150 and the SIP GW 130 using a Point-to-Point Protocol (PPP) over a tunnel 135. According to some aspects, tunnel 135 may be a PPP over User Datagram Protocol-Internet Protocol (UDP-IP) tunnel. In other aspects, tunnel 135 may be a PPP over generic routing encapsulation (GRE)-UDP-IP tunnel. Other tunneling configurations may also be used. An A11/A10 link 145 is used to transmit data between SIP GW 130 and PDSN 140. Once session establishment is complete, a PPP link 155 between PDSN 140 and MS 150 may be established.

Figure 2:
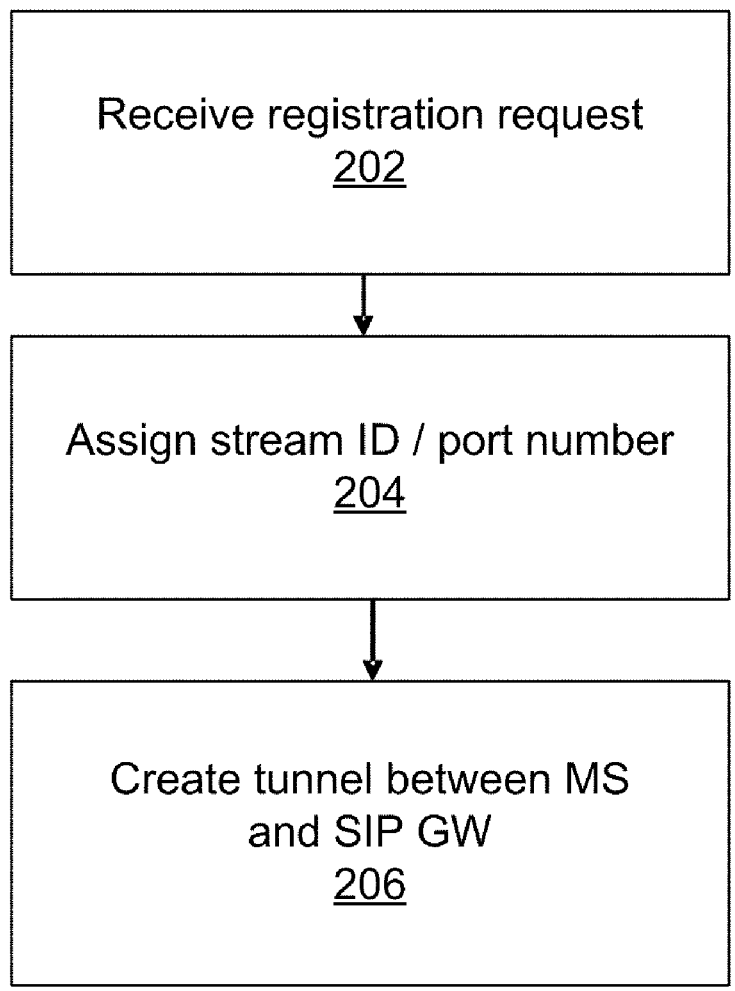
FIG. 2 is a flowchart depicting an exemplary registration process, in accordance with some aspects.

FIG. 2 is a flowchart depicting an exemplary registration process, in accordance with some aspects. As depicted at 202, a SIP GW may receive a registration request from a MS to establish a data session. According to some aspects, this initial registration request may be received upon power-on of the MS. The registration request may be a SIP INVITE message. Typically, a SIP INVITE message is sent for every data session. According to various exemplary aspects disclose herein, a single SIP INVITE message may be transmitted, and the session may be maintained as long as the MS remains registered.

As depicted at 204, the SIP GW may assign a stream ID and port number to the MS. According to some aspects, the registration request (e.g., the SIP INVITE) may include an identifier unique to the MS. The unique identifier may be, for example, the International Mobile Subscriber Identifier (IMSI) associated with the device. Other unique identifiers may also be used. The assigned stream ID and/or port number may be mapped to the unique identifier, and the SIP GW maintains the mapping and uses it to route calls. According to some aspects, the stream ID and/or port number are used for data traffic. The stream ID and port number may be returned to the MS in a "SIP 200 OK" message. In accordance with exemplary aspects, the stream ID allocation may be performed once during the lifetime of the MS registration on the WLAN. A stream ID may be reassigned, for example, if the MS powers down, losses WLAN coverage, or de-registers.

Prior to registration, the MS does not have an assigned stream ID. As such, the initial SIP INVITE message cannot be tunneled. As depicted at 206, upon successful registration, the SIP GW may create a tunnel between the MS and the SIP GW. The tunnel may be, for example, a PPP over UDP-IP tunnel, a PPP over GRE-UDP-IP tunnel, and/or other tunnels. The created tunnel enables both voice and data traffic to be carried over the tunnel.

Figure 3:
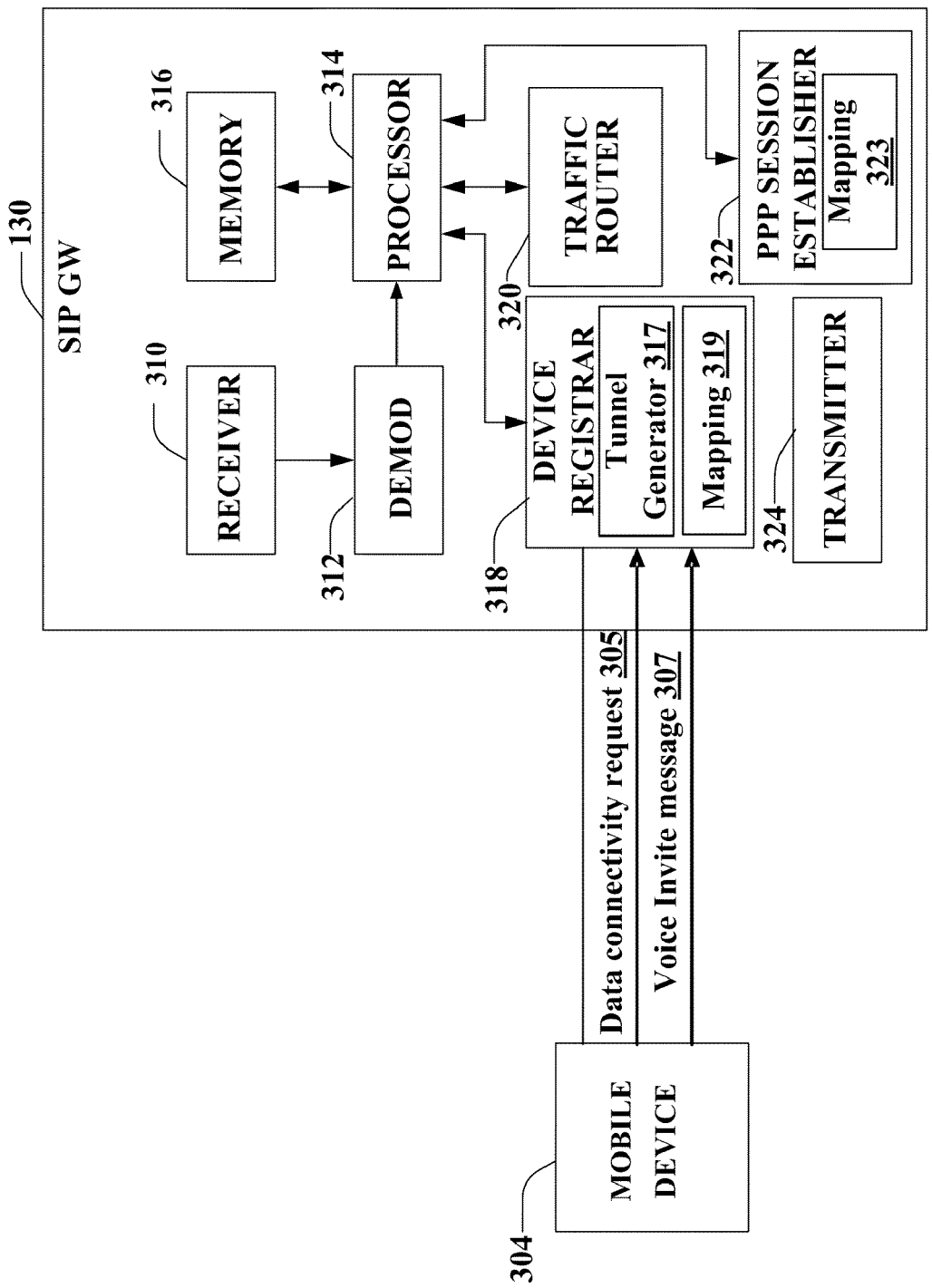
FIG. 3 is an exemplary SIP GW, in accordance with some aspects.

SIP GW 130 is depicted in further detail in FIG. 3. SIP GW 130 facilitates session establishment and authentication, as well as routing of data and control information between a mobile device and a 3G network (such as 3G network 110) over an IP-based connection, such as a WLAN. SIP GW 130 may comprise a receiver 310 that receives signals from one or more mobile devices 304 (such as MS 150) and a transmitter 324 that transmits to the one or more mobile devices 304. Receiver 310 may be operatively associated with a demodulator 312 that demodulates received information. Demodulated symbols may be analyzed by a processor 314, which is coupled to a memory 316 that stores information related to session establishment and data routing as well as other suitable information. Processor 314 may be coupled to device registrar 318, a routing module 320, and a PPP session establish module 322.

Device registrar 318 may be configured to receive registration requests, such as SIP INVITES, from one or more mobile stations to establish a data session. According to some aspects, the MS may issue a data connectivity request 305, which includes a unique identifier associated with the MS. Accordingly, the device registrar 318 may be configured to execute hardware and/or software operable to assign a stream ID and UDP port to the MS, and to maintain a mapping 319 of the unique identifier to the stream ID and/or port number for future data transactions. As explained herein, the stream ID allocation may be maintained through the lifetime of the MS registration with the WLAN.

Device registrar 318 may also include a tunnel generator 317 to create a tunnel between the MS and the SIP GW upon successful registration. According to some aspects, device registrar 318 may also be configured to accept a SIP INVITE message 307 to establish a voice call session. A SIP INVITE for VoIP may be a UDP encapsulated message using the stream ID assigned to the MS during the data session establishment. The registration module 318 may assign a SIP GW port to be used for SIP and RTP messages. The assigned port may be mapped to the stream ID and the unique identifier.

According to some aspects, additional streams may be created by allocating additional port numbers and/or stream IDs. These additional flows may be used to provide different priority/QOS to different packets/streams from the same MS. These tunnels may be created or deleted on demand, in accordance with some aspects. In other aspects, the additional tunnels may be created with the primary tunnel at first registration and may be maintained until the MS is registered.

The SIP GW 130 may also include a routing module 320 that facilitates the appropriate routing of voice and data calls. The routing module 320 may determine whether a call is a voice or data call, and may route the call according to the mapping based on the stream ID. Voice calls may be routed via an A2 interface to the MSC, while data calls may be routed over an A10 interface to the PDSN.

For data calls, a PPP session may be established between the MS and the PDSN for routing data. The initial stream ID context for data connectivity is maintained by registration module 318 independent of PPP session establishment and teardown. That is, even if a PPP session is terminated, device registrar 318 maintains the stream ID context binding to the MS and the tunnel.

According to some aspects, the SIP GW may further comprise a PPP session establishment module 322 that dynamically maps a stream ID to the A10 interface to the PDSN upon arrival of data at the SIP GW. This mapping 323 enables data traffic to be routed between the MS and the network entities.

Figure 4:
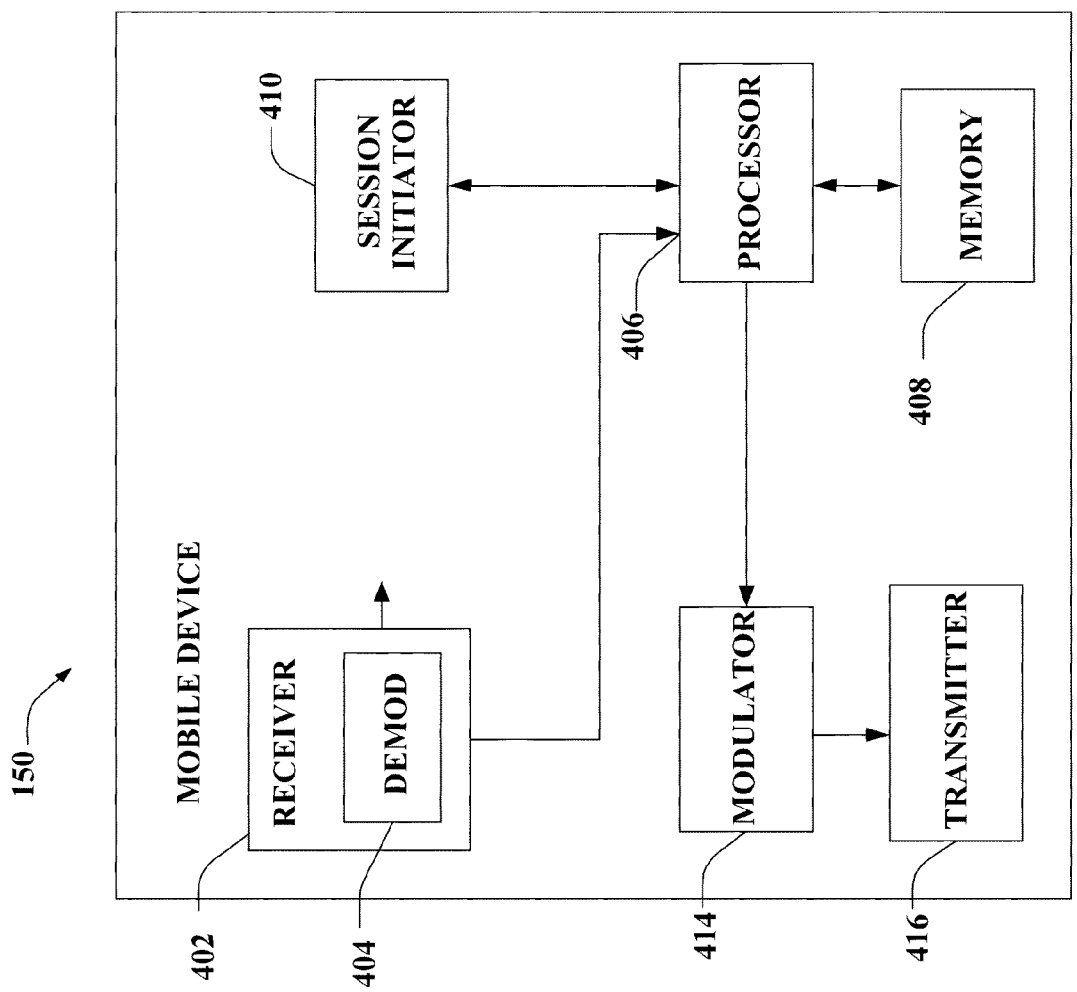
FIG. 4 is an exemplary mobile station, in accordance with some aspects.

FIG. 4 is an example of a mobile station 150 that may implement various disclosed aspects. MS 150 may achieve data connectivity to 3G network 110 via WLAN or normal 3G network connectivity procedures. MS 150 may comprise a receiver 402 that receives a signal from, for example, a receive antenna (not shown), performs typical actions (e.g., filters, amplifies, downconverts, etc.) the received signal, and digitized the conditioned signal to obtain samples. MS 150 may also comprise a demodulator 404 that can demodulate received symbols and provide them to a processor 206. Processor 406 may be a processor dedicated to analyzing information received by receiver 402 and/or generating information for transmission by a transmitter 416, a processor that controls one or more components of MS 150, and/or a processor that both analyzes information received by receiver 402, generates information for transmission by transmitter 416, and controls one or more components of MS 150.

MS 150 may additionally comprise memory 408 that is operatively coupled to processor 406 and that can store data to be transmitted, received data, information related to network connectivity, and/or any other suitable information. MS 150 may additionally store protocols and/or algorithms associated with network connectivity or other functions performed by MS 150. It will be appreciated that memory 408 may be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PRROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 408 is intended to comprise, without being limited to, these and any other suitable types of memory.

Processor 406 may further be operatively coupled to a session initiator 410 that can facilitate a connection to the 3G network. MS 150 may be a multi-mode device, capable of connecting to the 3G network via more than one connection procedure. For example, MS 150 may be configured to connect to the 3G network via WiFi (over WLAN 160), or using the connection mechanisms provided by the 3G network (e.g., cdma2000). Session initiator 410 may be configured to select an appropriate connection mode. According to some aspects, session initiator 410 may be configured to always connect via a WiFi connection if WiFi connectivity is detected. In other aspects, session initiator 410 may be configured to select the strongest connection, or the connection which will provide a specified quality of service level. In still other aspects, session initiator 410 may be configured to enable a user of MS 150 to select a preferred connection method on a case-by-case basis.

Session initiator 410 may also be configured to use SIP signaling to initiate a connection to the 3G network via WiFi. This may include, for example, issuing a SIP Invite to a SIP GW to request data connectivity. The established data connection may remain active as long as the MS 150 is connected to the WLAN.

In accordance with the exemplary aspects described herein, a new SIP INVITE is not required for every data session. Avoiding the requirement of issuing a SIP INVITE reduces latency and allows a PPP session to be established as soon as an application is started since the stream ID is already known. The tunnel between the SIP GW and the MS remains active and the MS uses the assigned stream ID to send voice and data calls. The systems and methods are also easily adoptable to third party operating systems. Moreover, voice and data services may be accommodated over the same tunnel.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 5:
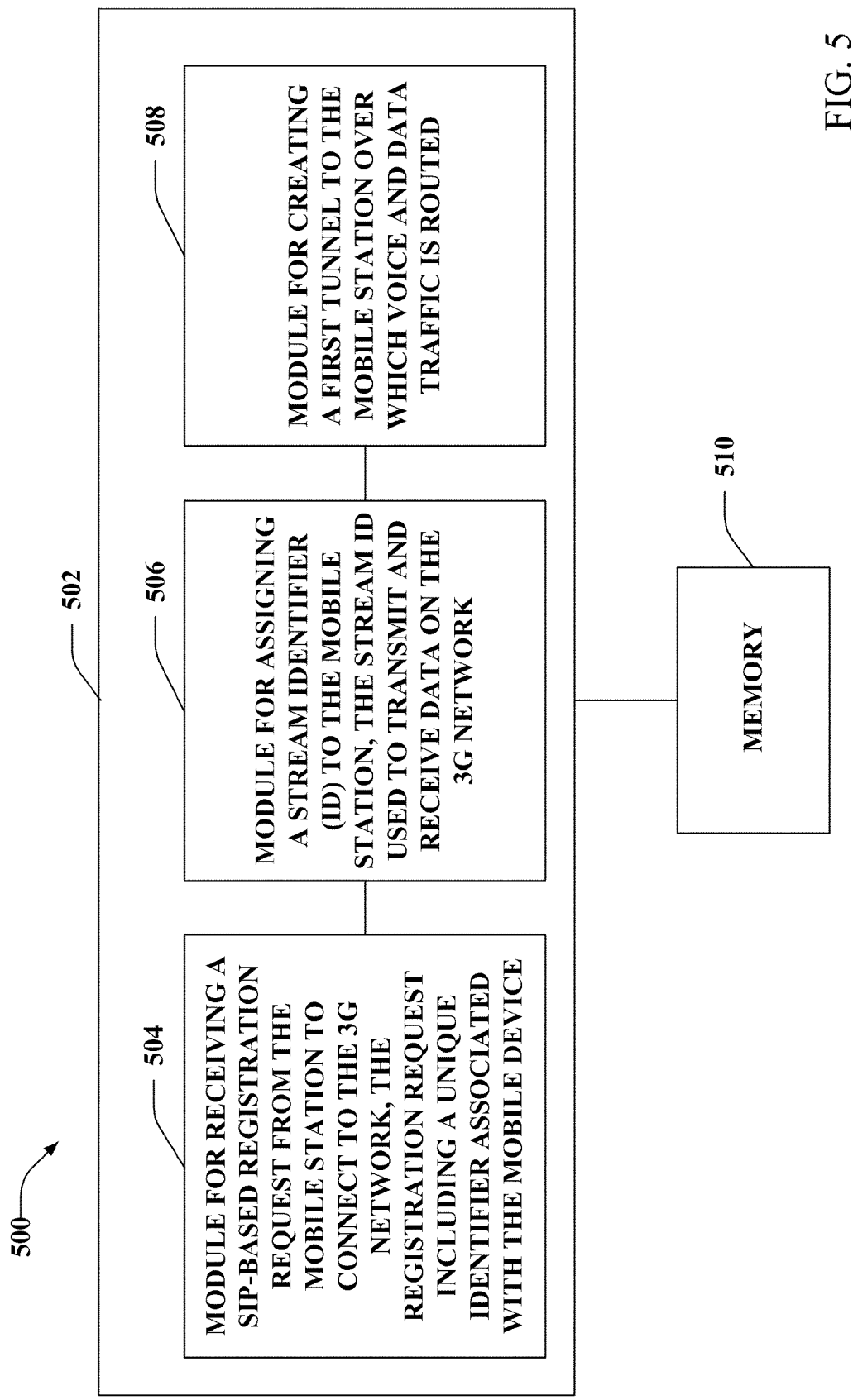
FIG. 5 an illustration of an example methodology that facilitates connecting to a 3G network, in accordance with some aspects.

Turning to FIG. 5, illustrated is a system 500 that receives requests from one or more mobile devices for data connectivity to a 3G network over a WLAN. System 500 can reside within a SIP GW, for example. As depicted, system 500 includes functional blocks that can represent functions implemented by a processor, software, or combination thereof (e.g., firmware). System 500 includes a logical grouping 502 of electrical components that act in conjunction. Logical grouping 502 can include a module for receiving a SIP-based registration request from a mobile station to connect to a subscriber access network, the registration request including a unique identifier associated with the mobile device 504. Moreover, logical grouping 502 can include a module for assigning a stream identifier (ID) to the mobile station, the stream ID used to transmit and receive data on the subscriber access network 506. The logical grouping 502 may also include a module for creating a first tunnel to the mobile station over which voice and data traffic is routed 508. The stream ID assignment and the first tunnel remain active as long as the mobile station remains registered. Additionally, system 500 can include a memory 510 that retains instructions for executing functions associated with electrical components 504 and 506. While shown as being external to memory 510, it is to be understood that electrical components 504, 506, and 508 can exist within memory 510.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for establishing a connection of a mobile station to a subscriber access network over an untrusted network, comprising:
   receiving a SIP-based registration request from the mobile station to connect to the subscriber access network over an untrusted network, the registration request including a unique identifier associated with the mobile device;
   assigning a first stream identifier (ID) to the mobile station, the stream ID used to identify data traffic associated with the mobile station and to transmit and receive data on the subscriber access network;
   creating a first tunnel to the mobile station over which at least one of voice or data traffic is routed, and
   maintaining the first stream ID assignment and the first tunnel as active as long as the mobile station remains registered.

2. The method of claim 1, wherein the registration request is a request for data connectivity.

3. The method of claim 1, wherein the registration request is issued upon power on of the mobile station.

4. The method of claim 1, further comprising:
   receiving, via first tunnel, a request for a voice-over-IP (VoIP) connection, the registration request being encapsulated using the assigned first stream ID;
   assigning a unique port number for voice traffic; and
   maintaining a mapping of the voice port to the first stream ID.

5. The method of claim 1, wherein the registration request is a SIP INVITE.

6. The method of claim 1, further comprising:
   reassigning the first stream ID upon determination that a reassignment is required based on pre-defined criteria.

7. The method of claim 6, wherein a recycle is required when the mobile station de-registers, loses coverage from the untrusted network, or powers down.

8. The method of claim 1, further comprising:
   receiving a data call;
   establishing a session between the mobile station and a PDSN of the subscriber access network;
   terminating the PPP session after data has been exchanged between the mobile station and the PDSN; and
   maintaining the first tunnel and the first stream ID as active after the PPP session has been terminated.

9. The method of claim 1, further comprising:
   assigning a second stream ID to the MS, the second stream ID having associated therewith a quality of service different than the first stream ID.

10. The method of claim 9, wherein the second stream ID is assigned on demand.

11. The method of claim 9, wherein the second stream ID is assigned at the same time as the first stream ID.

12. The method of claim 9, wherein the second stream ID is released on demand.

13. The method of claim 9, wherein the second stream ID is released when the first stream id is released.

14. An apparatus, comprising:
    a receiver configured to receive a SIP-based registration request from a mobile station to connect to a subscriber access network over an untrusted network, the registration request including a unique identifier associated with the mobile device;

a processor configured to assign a first stream identifier (ID) to the mobile station for identifying data traffic associated with the mobile station and transmitting and receiving data on the subscriber access network, and to create a first tunnel to the mobile station over which voice and data traffic is routed, wherein the processor is configured to maintain the first stream ID assignment and the first tunnel remain as active as long as the mobile station remains registered with the network; and a memory coupled to the processor for storing a mapping of the first stream ID assignment.

15. The apparatus of claim 14, wherein the registration request is a request for data connectivity.

16. The apparatus of claim 14, wherein the registration request is issued upon power on of the mobile station.

17. The apparatus of claim 14,
wherein the receiver is further configured to receive, via the first tunnel, a registration request for a voice-over-IP (VoIP) connection, the registration request being encapsulated using the assigned first stream ID; and
wherein the processor is further configured to assign a unique port number for voice traffic and to maintain a mapping of the unique port number to the stream ID.

18. The apparatus of claim 14, wherein the registration request is a SIP INVITE.

19. The apparatus of claim 14, wherein the processor is further configured to reassign the first stream ID upon a determination that a reassignment is required based on pre-defined criteria.

20. The apparatus of claim 19, wherein the pre-defined criteria comprise when the mobile station de-registers, loses coverage to the untrusted network, or powers down.

21. The apparatus of claim 14,
wherein the receiver is further configured to receive a data call;
wherein the processor is further configured to establish a PPP session between the mobile station and a PDSN of the subscriber access network and terminate the PPP session after data has been exchanged between the mobile station and the PDSN, and
wherein the processor maintains the first tunnel and the first stream ID as active after the PPP session has been terminated.

22. The apparatus of claim 14, wherein the processor is further configured to:
assign a second stream ID to the MS, the second stream ID having associated therewith a quality of service different than the first stream ID.

23. The apparatus of claim 22, wherein the second stream ID is assigned on demand.

24. The apparatus of claim 22, wherein the second stream ID is assigned at the same time as the first stream ID.

25. The apparatus of claim 22, wherein the second stream ID is released on demand.

26. The apparatus of claim 22, wherein the second stream ID is released when the first stream id is released.

27. An apparatus, comprising:
means for receiving a SIP-based registration request from the mobile station to connect to the subscriber access network over an untrusted network, the registration request including a unique identifier associated with the mobile device;
means for assigning a first stream identifier (ID) to the mobile station, the stream ID used to transmit and receive data on the subscriber access network;
means for creating a first tunnel to the mobile station over which at least one of voice and data traffic is routed; and
means for maintaining the first stream ID assignment and the first tunnel as active as long as the mobile station remains registered.

* * * * *